United States Patent
Pohl et al.

(10) Patent No.: US 12,409,857 B2
(45) Date of Patent: Sep. 9, 2025

(54) SAFETY MODULE FOR A SAFE DRIVE CONTROL OF A DRIVE SYSTEM IN AN AUTOMATION SYSTEM, DRIVE SYSTEM AND AUTOMATION SYSTEM

(71) Applicant: Beckhoff Automation GmbH, Verl (DE)

(72) Inventors: Christopher Pohl, Verl (DE); Andreas Kathöfer, Rietberg (DE); Frank Sieweke, Leopoldshöhe (DE); Robert Zutz, Verl (DE)

(73) Assignee: Beckhoff Automation GmbH, Verl (DE)

( * ) Notice: Subject to any disclaimer, the term of this patent is extended or adjusted under 35 U.S.C. 154(b) by 186 days.

(21) Appl. No.: 17/883,036

(22) Filed: Aug. 8, 2022

(65) Prior Publication Data

US 2022/0388541 A1 Dec. 8, 2022

Related U.S. Application Data

(63) Continuation of application No. PCT/EP2021/053974, filed on Feb. 18, 2021.

(30) Foreign Application Priority Data

Feb. 18, 2020 (DE) ..................... 10 2020 104 230.2

(51) Int. Cl.
*B60W 60/00* (2020.01)
*B60W 40/12* (2012.01)

(52) U.S. Cl.
CPC ........ *B60W 60/0015* (2020.02); *B60W 40/12* (2013.01); *B60W 2510/0657* (2013.01); *B60W 2554/4041* (2020.02)

(58) Field of Classification Search
CPC ............. B60W 60/0015; B60W 40/12; B60W 2554/4041; B60W 2510/0657
(Continued)

(56) References Cited

U.S. PATENT DOCUMENTS 7,868,619 B2   1/2011   Kangas
8,659,254 B2   2/2014   Jeno
(Continued)

FOREIGN PATENT DOCUMENTS

CN   110463029 A   11/2019
DE   102017104015 A1   10/2017
(Continued)

OTHER PUBLICATIONS

International Search Report and Written Opinion dated May 27, 2021 in connection with International Patent Application No. PCT/EP2021/053974, 21 pages including English translation.
(Continued)

*Primary Examiner* — Tiffany P Young
*Assistant Examiner* — Michael T Dowling
(74) *Attorney, Agent, or Firm* — Dorsey & Whitney LLP

(57) ABSTRACT

A safety module for a secured drive control of an automated drive system is configured to receive encoder data sent from an encoder unit to a drive unit, based on an encoder protocol via a protocol active unit. The safety module is configured to forward the encoder data from the protocol active unit to a safety logic and a protocol passive unit, check the forwarded encoder data with the aid of the safety logic for correspondence with predetermined safety criteria relating to operation of a motor unit, and transmit the forwarded encoder data via the protocol passive unit to the drive unit, in respective data packets based on the encoder protocol. The safety module can stop operation of the motor unit with the aid of the safety logic, if the encoder data does not
(Continued)

correspond to the predetermined safety criteria. A corresponding drive system and automation system are also provided.

7 Claims, 5 Drawing Sheets

(58) Field of Classification Search
USPC .......................................................... 701/23
See application file for complete search history.

(56) References Cited

U.S. PATENT DOCUMENTS

| | | | |
|---|---|---|---|
| 8,969,789 B2* | 3/2015 | Sato | G01D 5/24466 250/214 R |
| 10,184,860 B2 | 1/2019 | Schweikert et al. | |
| 10,298,166 B2 | 5/2019 | Matsumura et al. | |
| 2010/0164423 A1* | 7/2010 | Nakayama | G05B 19/0425 318/446 |
| 2019/0226450 A1* | 7/2019 | Theopold | G05B 19/048 |
| 2021/0234364 A1 | 7/2021 | Kishida et al. | |

FOREIGN PATENT DOCUMENTS

| | | |
|---|---|---|
| EP | 2367086 A2 | 9/2011 |
| EP | 2639556 A2 | 9/2013 |
| EP | 3023846 A1 | 5/2016 |
| EP | 3388906 A1 | 10/2018 |
| JP | 2017167704 A * | 9/2017 |
| WO | 2019239753 A1 | 12/2019 |

OTHER PUBLICATIONS

International Preliminary Report on Patentability dated May 31, 2022 in connection with International Patent Application No. PCT/EP2021/053974, 35 pages including English translation.

Office Action dated Dec. 22, 2020 in connection with German patent application No. 10 2020 104 230.2, 15 pages including English translation.

Beckmann, Guido, "Safety over EtherCAT Overview," EtherCAT Technology Group, Dec. 2019, 41 pages.

Office Action dated Dec. 9, 2022 in connection with European patent application No. 21707199.2, 80 pages including English translation.

English translation of Apr. 12, 2023 Office Action received in connection with Taiwanese patent application No. 202180014969.2, 3 pages.

Translation of Japanese Patent Publication No. JP2017167704A, Isoda Kokichi, Brother Ind Ltd, published Sep. 21, 2017.

* cited by examiner

SAFETY MODULE FOR A SAFE DRIVE CONTROL OF A DRIVE SYSTEM IN AN AUTOMATION SYSTEM, DRIVE SYSTEM AND AUTOMATION SYSTEM

CROSS-REFERENCE TO RELATED APPLICATIONS

This patent application claims the priority of International Patent Application No. PCT/EP2021/053974, filed Feb. 18, 2021, entitled "Safety Module for a Safe Drive Control of a Drive System in an Automation System, Drive System and Automation System," which claims priority to German patent application DE 10 2020 104 230.2, filed Feb. 18, 2020, entitled "Sicherheitsmodul für eine gesicherte Antriebssteuerung eines Antriebssystems in einem Automatisierungssystem, Antriebssystem and Automatisierungssystem," each of which is hereby incorporated by reference, in the entirety and for all purposes.

FIELD

The present application relates to a safety module for a safe drive control of a drive system in an automation system. The application further relates to a drive system with a safety module. The application further relates to an automation system comprising a drive system having a safety module.

BACKGROUND

Encoders are usually used to control drive systems, and they are used to generate an electrical signal (encoder signal) that encodes a current position of a motor unit of the drive system. Such encoders may also be referred to as coders. The mechanical movement may in this context e.g. be a translatory or a rotatory movement.

Absolute measuring encoders are known which generate electrical signals indicating an absolute value of a position. In addition, incremental encoders exist that generate signals indicating a change in a position compared to a previous position.

Based on the position information of the motor unit by the encoder, accessing the motor unit with the aid of a drive unit is possible.

In the state of the art, data communication between a drive unit and the encoder unit of the drive system is usually implemented via encoder interfaces which implement data exchange between drive units and encoder units according to corresponding encoder protocols. Encoder protocols are data communication protocols specialized for data communication between drive units and encoder units, which are set up for high-frequency data exchange of encoder data with cycle times in the microsecond range.

In order to use drive systems in automation systems, the drive systems must meet certain specifications with regard to the safety of the drive systems used. For example, for electric drives in automation systems, the standard IEC 61800-5-2:2016 defines certain safety-related functions such as Safe Torque Off (STO), Safe Stop 1 (SS1), Safe Stop 2 (SS2), Safe Operation Stop (SOS), Safe Limited Speed (SLS), Save Speed Monitor (SSM), Safe Speed Range (SSR), Safe Limited Position (SLP), Safe Position (SP), Safe Direction (SD) or Safe Brake Control, Safe Brake Test (SBC, SBT), which are provided to ensure safe operation of electrical drive units and prevent damage to personnel and machines. Depending on the use of the drive units, these may be assigned to different safety requirement levels and fewer, more or possibly different safety requirements may be placed on them.

Safety functions or safety-relevant functions are functions of drive systems. Safety requirements are requirements that are placed on drive systems in order to meet certain specifications. The requirements may comprise that the respective drive systems have a certain number of different safety functions. This may depend on the areas in which the drive systems in question are used. Depending on the type and use of the drive systems, these may be assigned to corresponding safety requirement levels, each of which differs in the safety requirements imposed.

Safety encoders or safety encoder interfaces, such as Hiperface DSL Safety and EnDat 2.2 Safety, are known in the state of the art and allow for safe operation of drive systems and fulfillment of corresponding safety requirements.

Such safety encoders or safety encoder interfaces provide comprehensively safe operation of corresponding drive systems and ensure reliable position information of the respective motor systems and secure data transmission channels for reliable data transmission. However, safety encoder interfaces are technically complex and costly, making them unattractive for certain applications. In addition, retrofitting drive components for which such safety concepts were not originally intended is also technically complex and costly.

Safety concepts are the concepts that are created for automation systems and comprise which requirement in terms of safety the respective automation systems have to fulfill and by which measures these requirements are to be met.

In addition, technically simple safety concepts, such as Safe Torque Off modules, are known in the prior art, which may be integrated into drive systems and may fulfill certain safety requirements. However, such safety concepts are only suitable for simple safety requirements and are not capable of ensuring comprehensively safe operation of drive systems.

Thus, a demand exists for compatible safety concepts that enable comprehensively safe operation of drive systems and fulfill comprehensive safety requirements, comparable to safety encoders or safety encoder interfaces known from the state of the art.

SUMMARY

The application provides a safety module that allows for safe drive control of a drive system in an automation system. The application further provides a drive system with a safety module. The application also provides an automation system having a drive system with a safety module.

EXAMPLES

A safety module for a safe drive control of a drive system in an automation system is provided, wherein the drive system comprises at least a drive unit, an encoder unit and a motor unit. The safety module may be connected to the drive unit and the encoder unit via at least one data connection, wherein the safety module comprises a protocol active unit, a protocol passive unit and a safety logic, which are set up to communicate with one another via a data communication.

The safety module can be configured to:
receive encoder data sent out by the encoder unit to the drive unit on the basis of an encoder protocol in corresponding data packets via the protocol active unit;
forward the received encoder data from the protocol active unit to the safety logic and the protocol passive unit;
check the forwarded encoder data, with the aid of the safety logic, for compliance with predetermined safety criteria relating to the operation of the motor unit;
send out the forwarded encoder data to the drive unit via the protocol passive unit on the basis of the encoder protocol in corresponding data packets; and
cause a stop of the operation of the motor unit via the safety logic, if the encoder data is detected by the safety logic as not conforming to the predetermined safety criteria.

This achieves the technical advantage that a safety module may be provided for secured drive control of a drive system in an automation system, which may be integrated into a drive system that is not operated with a safety encoder interface, the safety module being set up to meet all the requirements of certain safety specifications for corresponding drive systems in automation systems.

The protocol active unit and the protocol passive unit of the safety module allow for the safety module to be integrated into a drive system, in particular between a drive unit and an encoder unit of the drive system, and set up to provide data communication between the drive unit and the encoder unit.

The protocol active unit and the protocol passive unit of the safety module correspond to an active unit and a passive unit of an encoder protocol and an encoder interface, respectively, by which data communication is realized between the drive unit and the encoder unit of the drive system. The protocol active unit of the safety module is set up to provide data communication with the encoder unit on the basis of the encoder protocol used or the encoder interface used. The encoder active unit is furthermore set up so that the encoder protocol or the encoder interface used for data communication between the encoder unit and the drive unit of the drive system does not have to be modified for data communication between the encoder active unit and the encoder unit.

From the point of view of the encoder unit, data communication between the encoder unit and the protocol active unit of the safety module is thus identical to data communication between the encoder unit and the drive unit of the drive system. For this purpose, the protocol active unit receives the encoder data sent out by the encoder unit in accordance with the encoder protocol and forwards it to the protocol passive unit of the safety module.

The protocol passive unit of the safety module is embodied to transmit the forwarded encoder data to the drive unit in accordance with the existing encoder protocol. In this context, the protocol passive unit is set up so that the existing encoder protocol or the existing encoder interface do not have to be changed for data communication between the protocol passive unit and the drive unit. From the point of view of the drive unit, data communication between the drive unit and the protocol passive unit of the safety module is therefore identical to data communication between the drive unit and the encoder unit of the drive system.

The safety module may thus be integrated into an existing data connection between a drive unit and an encoder unit of a drive system without having to change an existing encoder protocol or an existing encoder interface by which data communication between the drive unit and the encoder unit is implemented.

BRIEF DESCRIPTION OF THE DRAWINGS

The application is described in more detail with reference to the accompanying figures, which show.

DETAILED DESCRIPTION

Figure 1:
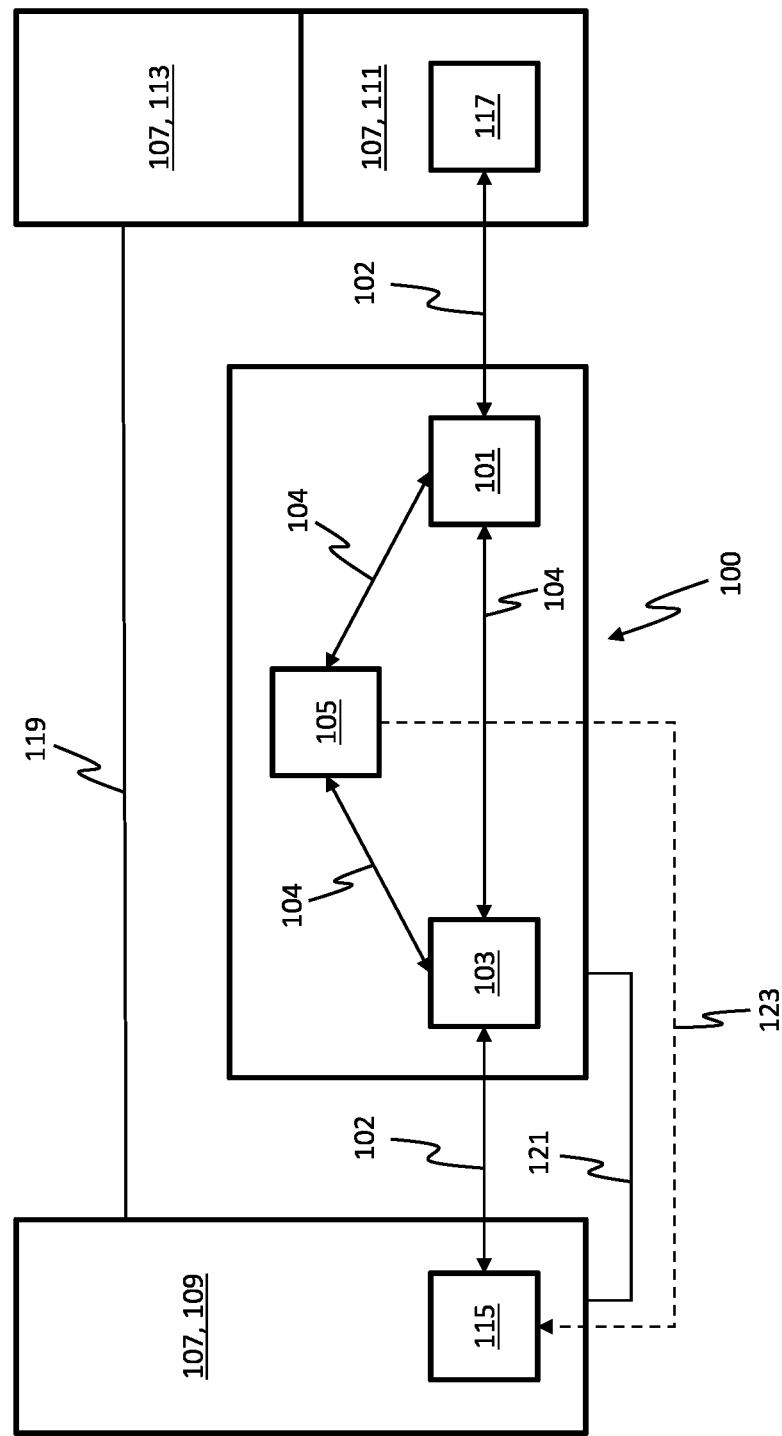
FIG. 1 is a schematic depiction of a safety module according to one embodiment, wherein the safety module is integrated into a drive system.

In the sense of the application, a data link is set up to provide data communication between communication partners. A data connection may e.g. be implemented via an encoder interface. Alternatively, a data connection may be implemented via a data bus connection. A data connection may be a purely data-related connection. Alternatively, a data connection may comprise a physical component in the form of a corresponding wiring.

For the purposes of the application, an interface is a data link between at least two data communication subscribers, wherein the interface is set up to provide data communication between the at least two data communication subscribers.

Alternatively, different encoder protocols may be used for data communication between the drive unit and the safety module, and the encoder unit and the safety module.

Thus, the protocol active unit of the safety module may communicate with the encoder unit on the basis of an encoder protocol or on the basis of an encoder interface, and the protocol passive unit of the safety module may communicate with the drive unit on the basis of another encoder protocol or on the basis of another encoder interface.

Via the safety logic of the safety module, encoder data sent out by the encoder unit may be checked with respect to predetermined safety criteria. If violations regarding the predetermined safety criteria of the encoder data sent out by the encoder unit are detected, the safety logic of the safety module may cause the operation of the motor unit of the drive system to stop. The safety logic is set up in such a way that all requirements of safety specifications relating to the respective drive type of the drive system may be met.

The safety module thus allows for an existing encoder protocol or for an existing encoder interface to be upgraded to a safety encoder protocol or safety encoder interface that is capable of meeting all the requirements of the relevant safety specifications for the corresponding drive types without having to modify the components of the drive system or the existing encoder protocol or encoder interface.

The safety module according to the application also allows for an existing encoder protocol or for an existing encoder interface to be upgraded to a safety encoder protocol or a safety encoder interface by integrating a hardware component, in the form of the safety module according to the application, into an existing drive system.

According to an embodiment, the safety module is further configured to send out requests for encoder data to the encoder unit through the protocol active unit.

This has the technical advantage of providing effective and efficient data communication between the safety module and the encoder unit of the drive system. By sending requests to send encoder data via the protocol active unit of the safety module to the encoder unit, a sending of corresponding encoder data via the encoder unit to the safety module or to the drive unit of the drive system may be initiated. The protocol active unit of the safety module is set up to initiate data communication with the encoder unit that is identical to data communication between the drive unit and the encoder unit. The protocol active unit is set up to send out requests that are identical to requests that the drive unit would send out to initiate data communication with the encoder unit according to the existing encoder protocol or the existing encoder interface.

In the sense of the application, requests are queries or commands corresponding to the respective used encoder protocols to the encoder unit to perform appropriate functions. This may comprise, among other things, the sending of encoder data.

For the purposes of the application, encoder data are data of the encoder unit and may comprise further parameter data of the drive unit in addition to position data of the motor unit. Alternatively, encoder data may comprise information of an electronic data sheet of the encoder or information relating to the encoder and/or the motor system. Parameter data may e.g. comprise temperature data, pressure data and/or other data that allow status statements regarding the status of the motor unit.

According to an embodiment, the safety module is further configured to receive requests sent by the drive unit to the encoder unit to send out encoder data via the protocol passive unit; and to send out encoder data corresponding to the requests to the drive unit via the protocol passive unit.

The technical advantage of this is that effective and efficient data communication may be provided between the drive unit and the safety module. For this purpose, the protocol passive unit is set up to receive requests to send encoder data sent out by the drive unit, and the safety module is set up to send out encoder data corresponding to the requests to the drive unit by the protocol passive unit. In this case, the protocol passive unit is configured to perform data communication with the drive unit that is identical to data communication between the drive unit and the encoder unit. The requests sent out by the drive unit correspond to the existing encoder protocol or to the existing encoder interface and are identical to requests sent out by the drive unit to the encoder unit to prompt it to send out corresponding encoder data.

By providing the corresponding encoder data to the drive unit via the safety module, comprehensive data communication may be ensured between the drive unit and the encoder unit via the safety module, in which corresponding encoder data of the encoder unit are exchanged between the drive unit and the encoder unit on the basis of the existing encoder protocol or the existing encoder interface or on the basis of the existing encoder protocols or the existing encoder interfaces for controlling the motor unit by the drive unit.

For this purpose, the protocol passive unit may receive the requests sent out by the drive unit and forward them to the protocol active unit so that the protocol active unit may send out corresponding requests to the encoder unit and drive the encoder unit to send out corresponding encoder data.

According to an embodiment, the safety module further comprises an encoder emulator, wherein the encoder emulator is configured to generate simulated encoder data, and wherein the simulated encoder data corresponds to a simulation of the encoder data of the encoder unit.

This achieves the technical advantage that a flexible and widely applicable safety module may be provided. By generating simulated encoder data that correspond to a simulation of the encoder data of the encoder unit, the safety module is able to provide encoder data independently. In particular, this may achieve the technical advantage that corresponding encoder data may be provided to the drive unit immediately in response to requests to transmit encoder data via the safety module, even in the event, that a forwarding of the request sent by the drive unit via the safety module to the encoder unit and a corresponding sending of encoder data by the encoder unit would lead to a delay in the provision of the encoder data to the drive unit by the safety module and consequently to an error message due to the delayed provision of the requested encoder data by the drive unit.

By providing simulated encoder data to the drive unit with the aid of the safety module, a corresponding error message of the drive unit due to delayed provision of requested encoder data may be prevented. This ensures that, despite integration of the safety module into the drive system, data communication between the drive unit and the encoder unit may be carried out unchanged for both the drive unit and the encoder unit.

Neither the drive unit nor the encoder unit is able to identify the safety module integrated in the drive system and for the drive unit, a data communication with the safety module is identical to a data communication with a safety encoder unit including a safety encoder interface and for the encoder unit, a data communication with the safety module is identical to a data communication with the drive unit via a corresponding safety encoder interface.

According to an embodiment, the safety module further comprises a memory unit, and wherein the safety module is further configured to store encoder data received by the protocol active unit from the encoder unit and/or simulated encoder data from the encoder emulator in the memory unit. The safety module comprises a processor and a memory unit.

This achieves the technical advantage that effective and efficient data communication may be provided between the safety module and the drive unit or encoder unit. Storing encoder data from the encoder unit or simulated encoder data from the encoder emulator in the memory unit of the safety module ensures that when the drive unit requests the transmission of encoder data, the corresponding encoder data or simulated encoder data stored in the memory unit may be accessed and made available to the drive unit by the safety module.

In this way, real encoder data of the encoder unit may be provided to the drive unit by the safety module by accessing the encoder data stored in the memory unit by the safety module, in particular in the event that corresponding forwarding of the requests of the drive unit to the encoder unit and the transmission of corresponding encoder data by the encoder unit would lead to delays in the provision of corresponding encoder data by the safety module to the drive unit. This is particularly possible if correspondingly queried encoder data of the encoder unit have only a small temporal variance, so that temporally earlier encoder data stored in the memory unit of the safety module have only small or no deviations from current encoder data of the encoder unit.

Similarly, simulated encoder data corresponding to expected encoder data of the encoder unit may be generated by the encoder emulator according to corresponding simulation models and stored in the memory unit. Particularly in the case of temporal variances of the encoder data of the encoder unit that are well covered by corresponding simulation models, reliable encoder data may thus be provided to the drive unit by the safety module without delay. Due to the memory unit, generating simulated encoder data with the aid of the encoder emulator may be performed at times when no collisions with other tasks of the safety module are to be feared. This allows for effective and efficient task processing of the safety module.

According to an embodiment, the encoder data sent out by the protocol passive unit according to the prompts are stored in the memory unit, and/or wherein the encoder data sent out according to the prompts are simulated encoder data from the encoder emulator.

This achieves the technical advantage that the drive unit may immediately be provided with corresponding encoder data via the safety module after it has sent out corresponding requests to send out encoder data. In particular, in the event that forwarding the requests sent by the drive unit to the encoder unit by the safety module and the corresponding transmission of the encoder data by the encoder unit would lead to a delay in the providing the encoder data to the drive unit via the safety module, error-free data communication between the drive unit and the safety module may be achieved by accessing the encoder data or simulated encoder data stored in the memory unit.

According to an embodiment, the safety module is further set up to forward the received requests to send out encoder data by the protocol passive unit to the protocol active unit; and to send out the forwarded requests to the encoder unit via the protocol active unit.

This achieves the technical advantage that effective and efficient data communication between the drive unit and the encoder unit may be provided by the safety module. By forwarding the requests for encoder data sent out by the drive unit through the safety module to the encoder unit, encoder data may be sent out by the encoder unit in accordance with the requests of the drive unit. The safety module is thus able to provide the drive unit with encoder data from the encoder unit corresponding to the transmitted requests. This ensures effective and efficient data communication between the drive unit and the encoder unit via the safety module.

According to an embodiment, the safety module may further be synchronized with the drive unit, wherein the safety module is arranged to send out corresponding requests via the protocol active unit to the encoder unit synchronously to sending out requests for encoder data by the drive unit.

This achieves the technical advantage that undelayed data communication between the drive unit and the encoder unit may be provided by the safety module. By synchronizing the safety module and the drive unit, it may be achieved that the drive unit and the safety module send out corresponding requests for encoder data at the same time or with a corresponding delay, wherein the safety module sends the requests directly to the encoder unit. This means that undelayed data communication between the drive unit and the encoder unit may be moderated by the safety module. By synchronously sending out the same requests via the drive unit and the safety module, a delay in the provision of corresponding encoder data by the safety module to the drive unit may be prevented. This allows for effective, efficient and error-free data communication between the drive unit and the safety module.

According to an embodiment, the safety module may further be connected to the drive unit via a data bus connection, wherein the safety module is arranged to send out to the drive unit, for causing a stop of the operation of the motor unit via the safety logic, a corresponding operation stop message based on a safety-related data packet according to a safe data bus protocol of the data bus connection.

This achieves the technical advantage that safe data communication may be provided between the safety module and the drive unit to effect a stop of the operation of the motor unit of the drive system. For this purpose, the safety module is set up to send a corresponding operation stop message to the drive unit via a safety-relevant data bus connection between the safety module and the drive unit in order to thus bring about a stop of the motor unit.

The safety-relevant data bus connection or corresponding safety-relevant data packets of a data bus protocol of the data bus connection may provide a safe transmission of the operation stop message from the safety module, in particular from the safety logic, to the drive unit. Thus, requirements of corresponding safety specifications may be fulfilled. The safety-relevant data bus connection between the drive unit and the safety module allows for safe and fast data communication for transmitting corresponding operational stop messages between the drive unit and the safety module.

For the purposes of the application, a safety-relevant data packet is a data packet of a data communication protocol that is provided with features that ensure that the safety-relevant data packet meets all requirements for safe data communication. An example of such a data communication protocol or for corresponding safety-relevant data packets would be the Safety-over-EtherCAT protocol known from the prior art.

According to an embodiment, the safety module is further connectable to a safe-torque-off function of the drive unit, wherein the safety module is arranged to cause the safety logic to send a corresponding safe-torque-off message to the safe-torque-off function of the drive unit to cause the safe-torque-off function to stop operation of the motor unit.

This achieves the technical advantage that a technically simple solution for bringing about a stop in the operation of the motor unit may be provided by the safety module. In particular for drive systems that do not have a safety-relevant data bus connection, a reliable and technically simple solution for bringing about an operational stop of the motor unit by the safety module may be provided by triggering a safe torque-off function of the drive unit by the safety module. The safety module may in this context be connected to a safe-torque-off function of the drive unit and is set up to send a corresponding safe-torque-off message to the safe-torque-off function in order to trigger the safe-torque-off function and cause an operational stop of the motor unit.

According to an embodiment, the safety module is further connectable to a shutdown mechanism integrated into a control connection between the drive unit and the motor unit, wherein the safety module is configured to trigger the shutdown mechanism to cause the safety logic to stop operation of the motor unit, and wherein the shutdown mechanism is embodied to interrupt the control connection.

This achieves the technical advantage that a technically simple and reliable solution may be provided for bringing about an operational stop of the motor unit by the safety module. In particular for drive systems that do not have a safety-relevant data bus connection or do not have drive units with a safe torque-off function, the control connection may be interrupted by triggering a shutdown mechanism installed in a control connection between the drive unit and the motor unit, thus bringing about an operational stop of the motor unit by the safety module. For this purpose, the safety module may be connected to the shutdown mechanism and is set up to trigger the shutdown mechanism to bring about the operational stop of the motor unit.

For the purposes of the application, a control connection is a data connection or an electrical connection between the drive unit and the motor unit via which the motor unit may be controlled by the drive unit. Alternatively, a control connection may be implemented exclusively via an electrical connection to the voltage supply of the motor unit.

According to an embodiment, the shutdown mechanism comprises at least a contactor unit.

This provides the technical advantage of a technically simple and reliable shutdown mechanism. Alternatively, the shutdown mechanism may comprise a plurality of contactor units.

For the purposes of the application, a contactor unit is a power contactor, a relay unit or a comparable switching element.

According to an embodiment, the safety module may be connected to another encoder unit of the drive system, and wherein the safety module is configured to:
- receive further encoder data sent out by the further encoder unit to the drive unit based on the encoder protocol in corresponding data packets via the protocol active unit;
- forward the received further encoder data from the protocol active unit to the safety logic;
- check the forwarded encoder data of the encoder unit, taking into account the forwarded further encoder data of the further encoder unit, with the aid of the safety logic for compliance with the predetermined safety criteria; and
- to cause a stop of the operation of the motor unit by the safety logic, if the encoder data has been recognized by the safety logic as not conforming to the predetermined safety criteria, taking into account the further encoder data.

This achieves the technical advantage that the safety module according to the application may be connected to and operated with two different encoder units. Hereby, a safety encoder, the encoder data of which comprise at least a first position datum and a second position datum, and which are provided for safety checking of the safety logic of the safety module, may be replaced by two independent encoder units, one encoder unit generating a first position datum and the other encoder unit generating a second position datum, which are provided for safety checking of the safety logic of the safety module.

This provides the technical advantage that two more cost-effective simple encoder units may be used instead of a cost-intensive safety encoder in order to meet the requirements of the respective safety specifications with regard to the drive type of the respective drive system. For this purpose, encoder data from one encoder unit are interpreted as the first position datum and encoder data from the other encoder unit is interpreted as the second position datum, which is used for safety analysis by the safety logic. The protocol active unit of the safety module is set up to perform data communication with the one encoder unit and the other encoder unit.

According to an embodiment, the encoder data and/or the further encoder data comprise position data and/or parameter data of the motor unit, wherein the position data describe at least one position of the motor unit, and wherein the parameter data describe at least one parameter of the motor unit different from the position, which parameter allows for a status assessment of the motor unit.

This achieves the technical advantage that in addition to position data describing a position of the motor unit, parameter data providing status-relevant information regarding the motor unit may also be taken into account for safety analysis by the safety logic of the safety module. This allows for a comprehensive assessment of the safety situation of the motor unit by the safety module. Parameter data may comprise any status-relevant information of the motor unit, e.g. temperature, pressure, speed, acceleration and other relevant information that may be of interest for a description of the status of the motor unit.

According to an embodiment, the safety criteria include a maximum position and/or a maximum speed and/or a maximum acceleration and/or a maximum temperature of the motor unit.

This achieves the technical advantage that a comprehensive and detailed assessment of a safety status of the engine unit may be achieved. Due to the specific safety criteria, a specified and detailed assessment of the safety status of the motor unit may be achieved and requirements for correspondingly specified safety specifications may be met.

A drive system comprising at least a drive unit, an encoder unit, a motor unit, and a safety module according to the application is provided, wherein the drive unit and the encoder unit are interconnected via a data link and are arranged to communicate via an exchange of data packets according to an encoder protocol, wherein the safety module is connected to the drive unit and the encoder unit via the data link, and wherein the drive unit is connected to the motor unit via a control link for controlling the motor unit.

By this, the technical advantage is achieved that a drive system with the advantages of the safety module according to the application may be provided.

An automation system comprising a control unit and at least one drive system according to the application is provided, wherein the drive system is connected to the control unit via a data bus connection, wherein the control unit is arranged to control the drive system according to the application.

This achieves the technical advantage that an automation system with a drive system may be provided with the advantages of the safety module according to the application.

FIG. 1 shows a schematic depiction of a safety module 100 according to an embodiment in which the safety module 100 is integrated into a drive system 107.

According to the embodiment in FIG. 1, the drive system 107 in an automation system comprises at least a drive unit 109, an encoder unit 111 and a motor unit 113. The safety module 100 is connected to the drive unit 109 and the encoder unit 111, and thus indirectly also to the motor unit 113 via an encoder interface 102. The safety module 100 comprises a protocol active unit 101, a protocol passive unit 103, and a safety logic 105 that are arranged to communicate with one another by data communication. The safety module 100 is embodied to:

receive the encoder data sent out from the encoder unit 111 to the drive unit 109 on the basis of an encoder protocol via the protocol active unit 101;

forward the received encoder data from the protocol active unit 101 to the safety logic 105 and the protocol passive unit 103;

check the forwarded encoder data for compliance with predetermined safety criteria relating to the operation of the motor unit 113 with the aid of the safety logic 105;

transmitting the forwarded encoder data to the drive unit 109 in respective data packets based on the encoder protocol with the aid of the protocol passive unit 103; and cause a stop of the operation of the motor unit 113 with the aid of the safety logic 105, if the encoder data is detected by the safety logic 105 as not conforming to the predetermined safety criteria.

In the embodiment shown in FIG. 1, the safety module 100 is integrated into a drive system 107. The encoder unit 111 and the motor unit 113 of the drive system 107 are connected to each other. In order to control the motor unit 113 with the aid of the drive unit 109, both units are connected via a control link 119. The drive unit 109 comprises a drive protocol active unit 115 and the encoder unit 111 comprises an encoder protocol passive unit 117. The drive unit 109 and the encoder unit 111 are interconnected via the encoder interface 102. The encoder interface 102 is integrated into the safety module 100.

The safety module 100 comprises a protocol active unit 101, a protocol passive unit 103, and safety logic 105, each of which is connected in pairs via a first data interface 104. The protocol passive unit 103 of the safety module 100 is connected to the drive protocol active unit 115 of the drive unit 109 via the encoder interface 102. The protocol active unit 101 of the safety module 100 is connected to the encoder protocol passive unit 117 of the encoder unit 111 via the encoder interface 102.

The safety module 100 is connected to the drive unit 109 via a data bus connection 121.

In order to transmit encoder data from the encoder unit 111 to the drive unit 109, the encoder unit 111 sends out corresponding encoder data to the drive unit 109 according to an encoder protocol of the encoder interface 102. The transmitted encoder data are received by the protocol active unit 101 of the safety module 100. The protocol active unit 101 may process and check the received encoder data for correctness, e.g. by the protocol active unit 101 checking a checksum of the transmitted encoder data.

Subsequently, the protocol active unit 101 may forward the received encoder data to the protocol passive unit 103 via the first data interface 104. Additionally, the encoder active unit 101 forwards the received encoder data to the safety logic 105 via the first data interface 104. The forwarded encoder data are sent to the drive unit 109 by the protocol passive unit 103 via the encoder interface 102. The drive unit 109 receives the sent-out encoder data via the drive protocol active unit 115. The protocol active unit 101, the protocol passive unit 103, the drive protocol active unit 115 and the encoder protocol passive unit 117 are in this context passive unit units or active unit units of the encoder protocol of the encoder interface 102. The encoder interface 102 may be an encoder interface known in the prior art, for example HIPERFACE DSL or EnDat.

Alternatively, the safety module 100 may communicate with the encoder unit 111 via an encoder interface, while the safety module 100 communicates with the drive unit 109 via another encoder interface. In this case, the protocol active unit 101 and the protocol passive unit 103 of the safety module 100 are active unit and passive unit units of two different protocols and two different interfaces, i.e. encoder interfaces of different types. For data communication or, respectively, for forwarding data within the safety module 100 between the protocol active unit 101 and the protocol passive unit 103, these and/or the safety module 100 are set up to perform a protocol conversion in order to express data of one interface in the respective other interface.

The protocol active unit 101 of the safety module 100 is configured to perform data communication with the encoder protocol passive unit 117 of the encoder unit 111 that is identical to data communication between the drive protocol active unit 115 and the encoder protocol passive unit 117. Thus, for the encoder protocol passive unit 117, a data communication with the protocol active unit 101 of the safety module 100 is identical to a data communication with the drive protocol active unit 115 of the drive unit 109. The protocol passive unit 103 of the safety module 100 is arranged to perform a data communication with the drive protocol active unit 115 of the drive unit 109 that is identical to a data communication between the drive protocol active unit 115 of the drive unit 109 and the encoder protocol passive unit 117 of the encoder unit 111. Thus, for the drive protocol active unit 115 of the drive unit 109, the protocol passive unit 103 of the safety module 100 is indistinguishable from the encoder protocol passive unit 117 of the encoder unit 111.

Thus, for the drive protocol active unit 115 of the drive unit 109 and the encoder protocol passive unit 117 of the encoder unit 111, data communication in which, as described above, an exchange of encoder data between the encoder protocol passive unit 117 of the encoder unit 111 and the drive protocol active unit 115 of the drive unit 109 is performed indirectly via the protocol active unit 101 and the protocol passive unit 103 of the safety module 100, is analogous to a direct data exchange of encoder data between the encoder protocol passive unit 117 of the encoder unit 111 and the drive protocol active unit 115 of the drive unit 109.

The encoder data emitted by the encoder unit 111 may be emitted in accordance with a predetermined emitting clock by the encoder protocol passive unit 117 of the encoder unit 111. Alternatively, the encoder data emitted by the encoder unit 111 may be emitted in response to a request to emit encoder data previously emitted by the drive unit 109. To this end, in accordance with a further embodiment, the safety module 100 is configured to receive requests to transmit encoder data transmitted by the drive protocol active unit 115 of the drive unit 109 via the protocol passive unit 103 and to transmit corresponding encoder data to the drive protocol active unit 115 via the protocol passive unit 103. Furthermore, the safety module 100 may be configured to forward the requests received from the protocol passive unit 103 to the protocol active unit 101 via the first data interface 104, and to send out the forwarded requests to the encoder protocol passive unit 117 of the encoder unit 111 through the protocol active unit 101.

The safety module 100 is thus arranged to provide comprehensive data communication between the drive unit 109 and the encoder unit 111, in which encoder unit encoder data and requests for transmission of encoder units of the drive unit are exchanged between the drive unit 109 and the encoder unit 111.

For example, encoder data may comprise position data of the motor unit 113 describing positions of a motor position of the motor unit 113. Furthermore, encoder data may comprise parameter data describing additional parameters, such as a temperature, a speed, an acceleration, a pressure, or similar parameters of the motor unit. Requests to send encoder data may be send commands or send requests corresponding to the encoder protocol of the encoder interface 102.

The encoder unit 111 may be a safety encoder, and encoder data from the safety encoder may comprise a first position datum and a second position datum usable for safety analysis.

The encoder data transmitted from the protocol active unit 101 to the safety logic 105 via the first data interface 104 is subjected to a safety analysis by the safety logic 105 according to predetermined safety criteria. For example, the safety criteria may be a maximum position and a minimum position of the motor unit 113, respectively. Alternatively, the safety criteria may comprise a maximum speed or a minimum speed, a maximum acceleration or a minimum acceleration, a maximum temperature or a minimum temperature, a maximum pressure or a minimum pressure, respectively, or further safety-related criteria of the operation of the motor unit 113, such as maximum values regarding vibrations occurring in the motor unit. Alternatively, the safety criteria may additionally be safety criteria specific to the type of motor unit, which allow a statement to be made about the safety condition of the motor unit 113.

To analyze the encoder data via the safety logic 105, the safety logic 105 may use various analysis procedures known in the prior art.

If the analysis of the safety logic 105 reveals that encoder data of the encoder unit 111 does not meet the safety criteria, e.g by exceeding or falling below maximum or minimum positions, maximum or minimum speeds, maximum or minimum accelerations, maximum or minimum temperatures, or similar parameters of the motor unit 113, the safety logic 105 causes the operation of the motor unit to stop.

In the embodiment in FIG. 1, the safety logic 105 sends a corresponding operation stop message to the drive unit 109 for this purpose, on the basis of which the drive unit 109 stops the operation of the motor unit 113 via the control connection 119. In the embodiment of FIG. 1, the safety logic 105 sends the operation stop message to the drive unit 109 on the basis of a safety-relevant data packet in accordance with a safety-relevant data communication 123 of the data bus connection 121. A safety-relevant data communication 123 may e.g. be implemented via a safety-relevant field bus protocol, such as Safety-over-EtherCAT. The safety-relevant data connection 123 ensures that the operating stop message of the safety logic 105 is transmitted to the drive unit 109 reliably and without delay, so that a corresponding operating stop of the motor unit 113 may be effected immediately after identification of the safety risk.

Figure 2:
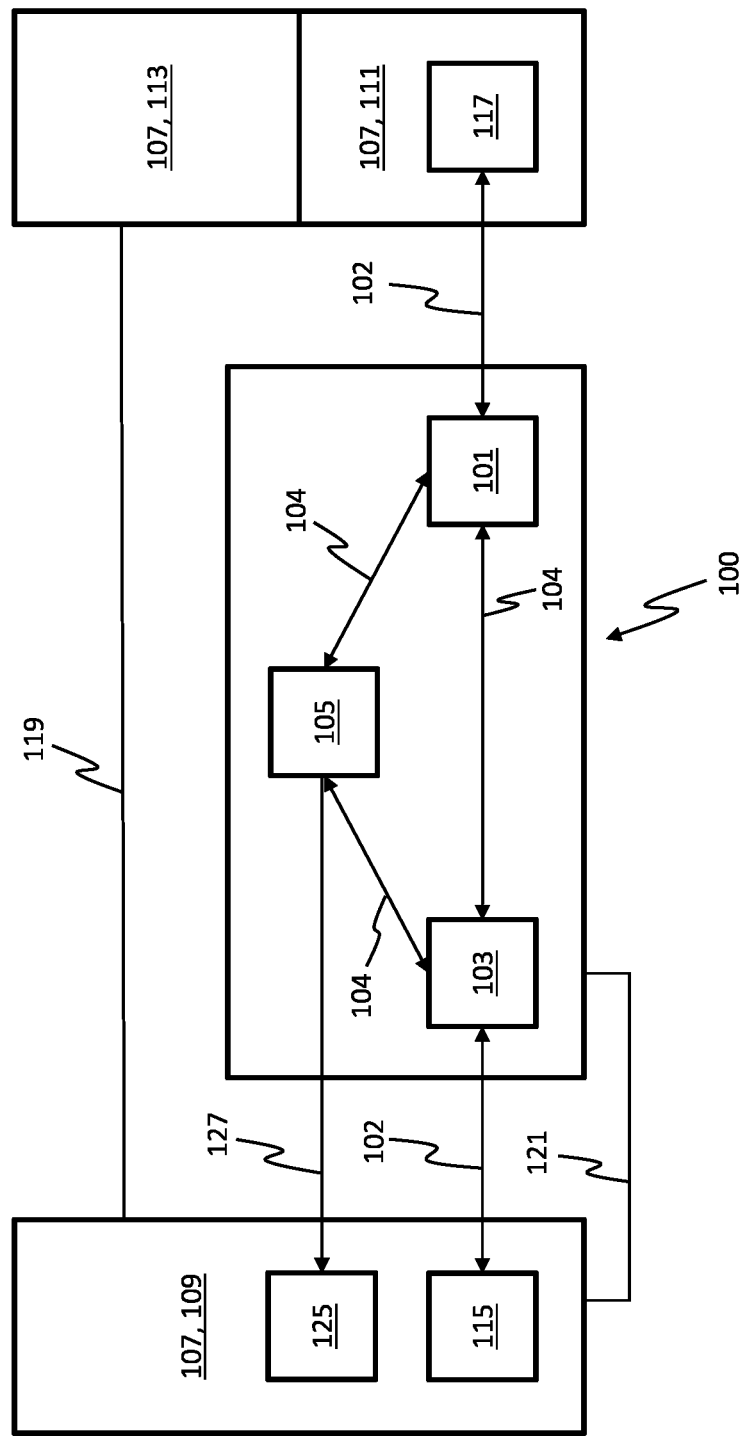
FIG. 2 is another schematic depiction of a safety module according to a further embodiment, wherein the safety module is integrated into a drive system.

FIG. 2 shows another schematic depiction of a safety module 100 according to a further embodiment, wherein the safety module 100 is integrated into a drive system 107.

The embodiment in FIG. 2 differs from the embodiment in FIG. 1 in that the drive unit 109 includes a safe-torque-off function 125. The safety logic 105 is connected to the safe-torque-off function 125 of the drive unit 109 via a safe-torque-off interface 127. If the safety logic 105 identifies that the encoder data of the encoder unit 111 does not meet the safety criteria, the safety logic 109 sends a safe-torque-off message to the safe-torque-off function 125 of the drive unit 109 via the safe-torque-off interface 127, causing the safe-torque-off function 125 to stop the operation of the motor unit 113. For this purpose, the drive unit 109 causes the motor unit 113 to stop operating via the control link 119.

Figure 3:
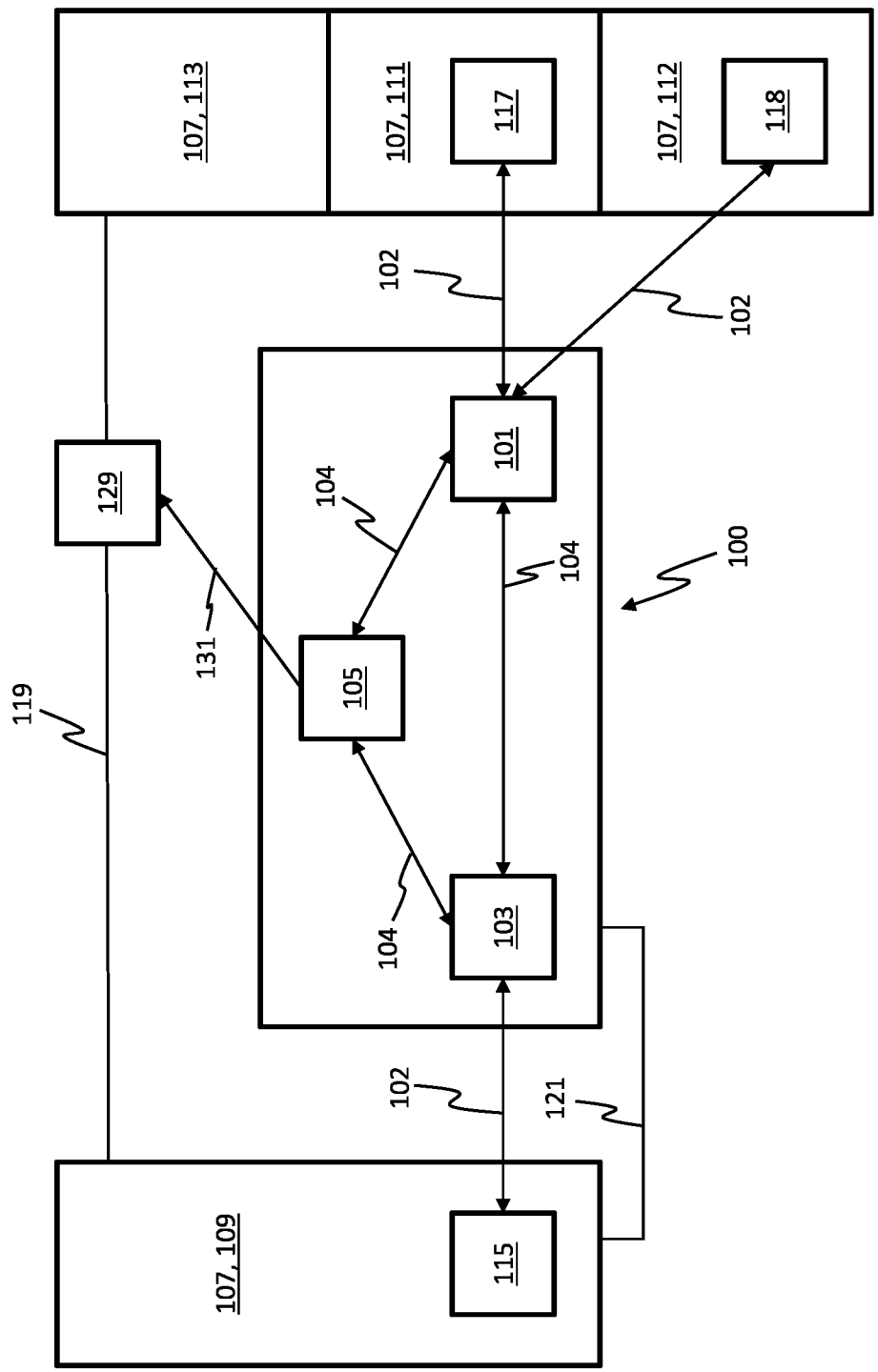
FIG. 3 is another schematic depiction of a safety module according to a further embodiment, wherein the safety module is integrated into a drive system.

FIG. 3 shows another schematic depiction of a safety module 100 according to a further embodiment, wherein the safety module 100 is integrated into a drive system 107.

The embodiment in FIG. 3 differs from the embodiments in FIG. 1 and FIG. 2 in that a shutdown mechanism 129 is integrated into the control link 119. The safety logic 105 is connected to the shutdown mechanism 129 via a shutdown connection 131. Furthermore, in the embodiment shown in FIG. 3, the drive system 107 comprises a further encoder unit 112, which in turn comprises a further encoder protocol passive unit 118. The further encoder unit 112 is connected to the motor unit 113 and embodied to receive further encoder data from the motor unit 113 and to send it out via the encoder interface 102 to the drive unit 109 or the safety module 100, in particular to the protocol active unit 101 of the safety module 100. In the embodiment shown in FIG. 3, the encoder unit 111 and the further encoder unit 112 are each not a safety encoder, but are merely embodied as simple encoders.

The further encoder data sent out by the further encoder unit 112 is received by the protocol active unit 101 of the safety module 100 and forwarded to the safety logic 105 via the first data interface 104. The further encoder data is taken into account by the safety logic 105 in addition to the encoder data of the encoder unit 111. For this purpose, in particular, a first position datum of the motor unit 113 is created from the encoder data of the encoder unit 111, and a second position datum of the motor unit 113 is created from the further encoder data of the further encoder unit 112. The first position datum of the encoder data of the encoder unit 111 describing a first position of the motor unit 113 and the second position datum of the further encoder data of the further encoder unit 112 describing a second position of the motor unit 113 are jointly considered for the analysis of the encoder data and further encoder data, respectively, by the safety logic 105.

Apart from the second position data, the further encoder data may incidentally comprise further parameter data.

If the safety logic 105 detects a violation of the safety requirements based on the analysis of the encoder data of the encoder unit 111 and the further encoder data of the further encoder unit 112, the safety logic 105 triggers the shutdown mechanism 129 via a corresponding signal transmitted via the shutdown connection 131, thereby interrupting the control connection 119 between the drive unit 109 and the motor unit 113. This causes the operation of the motor unit 113 to stop. The shutdown mechanism 129 may e.g. be a relay mechanism or a contactor mechanism.

Alternatively, combinations of the embodiments according to FIG. 1, FIG. 2 and FIG. 3 are possible, as well.

Figure 4:
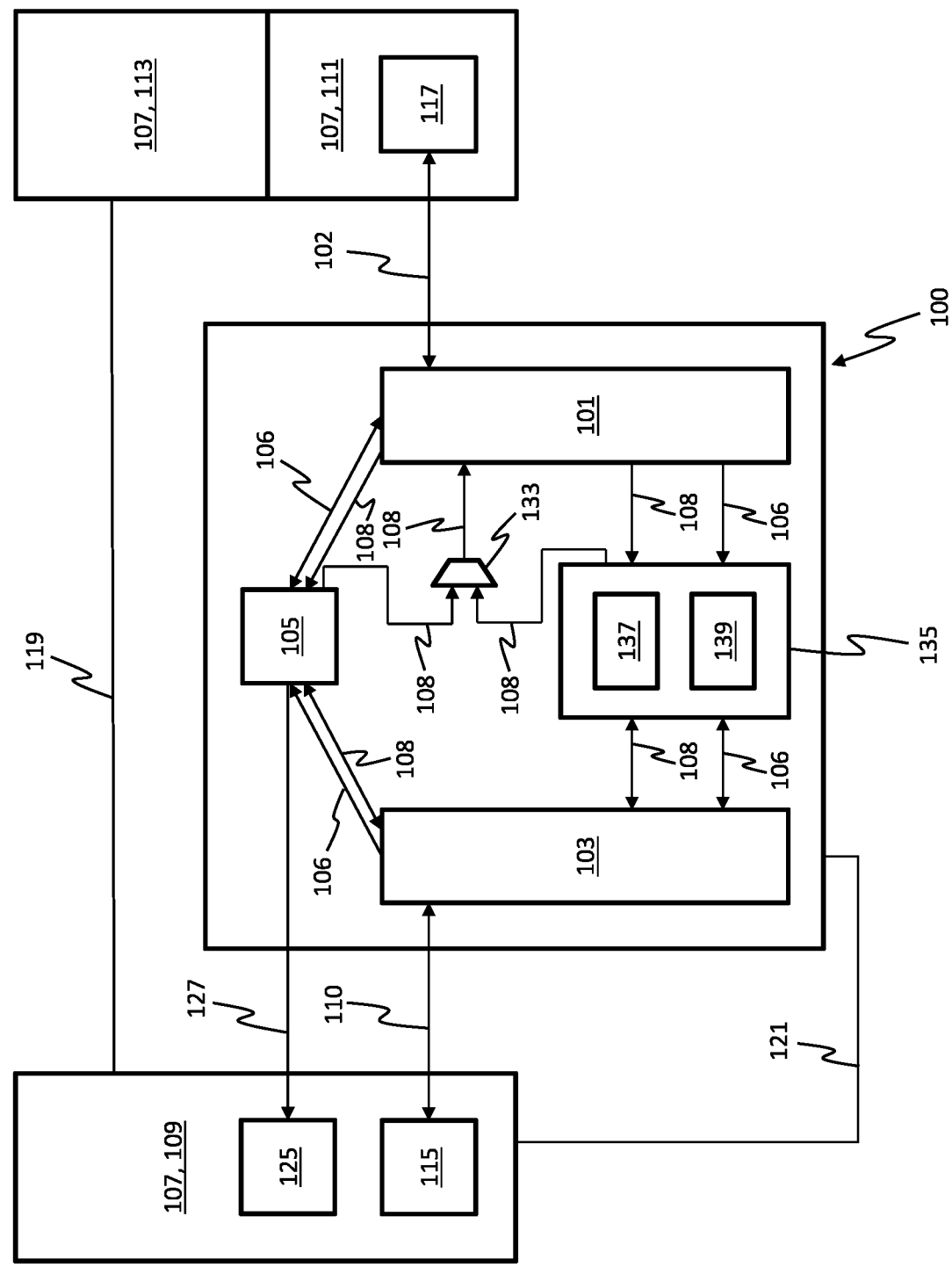
FIG. 4 is another schematic depiction of a safety module according to a further embodiment, wherein the safety module is integrated into a drive system.

FIG. 4 shows another schematic depiction of a safety module 100 according to a further embodiment, wherein the safety module 100 is integrated into a drive system 107.

The embodiment in FIG. 4 is based on the embodiment in FIG. 2.

Deviating from the embodiment in FIG. 2, the drive protocol active unit 115 and the protocol passive unit 103 of the safety module 100 are connected via a further encoder interface 110, which differs from the encoder interface 102 according to FIG. 2. A data communication between the drive protocol active unit 115 and the protocol passive unit 103 takes place based on a protocol of the further encoder interface 110.

Further differing from the embodiment in FIG. 2, the safety module 100 comprises an encoder emulator 135. The encoder emulator 135 comprises a position emulation 137 and a memory unit 139. The protocol active unit 101, the protocol passive unit 103, the safety logic 105 and the encoder emulator 135 are connected to one another via a second data interface 106 and a third data interface 108. Here, the second data interface 106 is used to transmit cyclic data, while the third data interface 108 is used to transmit acyclic data. Cyclic data, in the sense of the application, comprise data that are transmitted within a control cycle. Acyclic data in the sense of the application are data that are transmitted between control cycles or distributed over several control cycles.

A cyclic data transmission and an acyclic data transmission play a role in particular in an application of the drive system 107 in an automation system. In this case, a cyclic data transmission relates to a transmission of data within a control cycle of the automation system. An acyclic data transmission, on the other hand, relates to a transmission of data that is performed between two control cycles, or, respectively, that may extend over more than one control cycle. A cyclic data transmission usually comprises the data that are immediately required to control the automation system. An acyclic data transmission may also comprise data that are not directly required for control, e.g. status data of individual components of the automation system.

In the present embodiment, position data of the encoder unit 111 in particular are exchanged between the encoder unit 111 and the drive unit 109 for controlling the motor unit 113 in a cyclic data transmission. In an acyclic data transmission, parameter data of the encoder unit 111 or of the motor unit 113 may be exchanged between the encoder unit 111 and the drive unit 109.

If the drive unit 109 sends a request to transmit encoder data to the encoder unit 111 in a cyclic data transmission according to the control of the motor unit 113, the protocol passive unit 103 of the safety module 100 receives the request sent by the drive protocol active unit 115 and forwards it to the safety logic 105 via the second data interface 106. The safety logic 105 forwards the forwarded request via the second data interface 106 to the protocol active unit 101, which in turn sends the request via the encoder interface 102 to the encoder protocol passive unit 117 of the encoder unit 111. Hereupon, the encoder protocol passive unit 117 of the encoder unit 111 sends corresponding encoder data to the drive unit 109 via the encoder interface 102, which is received by the protocol active unit 101 of the safety module 100 and forwarded to the encoder emulator 135 via the second data interface 106. The encoder emulator 135 forwards the forwarded encoder data via the second data interface 106 to the protocol passive unit 103, which sends out the forwarded encoder data via the further encoder interface 110 to the drive protocol active unit 115 of the drive unit 109.

For analysis of the encoder data by the safety logic 105, the encoder data sent out by the encoder protocol passive unit 117 of the encoder unit 111 is furthermore forwarded by the protocol active unit 101 to the safety logic 105 via the second data interface 106. If the safety logic 105 detects a safety hazard based on the encoder data, the safety logic 105 causes the safe-torque-off function 125 of the drive unit 109 to cause an operational stop of the motor unit 113.

As an alternative to forwarding the request via the first data interface 104 to the safety logic 105, the protocol passive unit 103 forwards the request to send out encoder data of the drive unit 109 via the second data interface 106 to the encoder emulator 135. Subsequently, the encoder emulator 135 may forward corresponding encoder data stored in the memory unit 139 via the second data interface 106 to the protocol passive unit 103, which in turn sends out the forwarded encoder data to the drive protocol active unit 115 of the drive unit 109.

Alternatively, in response to the forwarded request to send encoder data, the encoder emulator 135 may generate simulated encoder data corresponding to the requests via the position emulation 137 and forward the simulated encoder data to the protocol passive unit 103 via the second data interface 106, which in turn sends the simulated encoder data to the drive protocol active unit 115 of the drive unit 109. The sending of encoder data stored in the memory unit 139 and the sending of simulated encoder data, respectively, may be performed particularly for those cases for which forwarding the request to send out encoder data to the encoder unit 111 and transmitting the encoder data of the encoder unit 111 via the safety module 100 to the drive unit 109 would result in a delay and thus in the sending out of an error message due to the drive unit 109 not providing the encoder data in time.

By taking into account encoder data stored in the memory unit 139 or simulated encoder data, respectively, it may be achieved that the safety module 100 is not registered by either the drive protocol active unit 115 of the drive unit 109 or the encoder protocol passive unit 117 of the encoder unit 111, and undelayed and reliable data communication may be provided between the drive unit 109 and the encoder unit 111 from the perspective of the drive unit 109. Alternatively, requests from the drive protocol active unit 115 to the encoder protocol passive unit 117 may additionally or exclusively be forwarded to the encoder protocol passive unit 117 with a time delay. This may particularly be considered for cases in which requests from the drive protocol active unit 115 concern an action of the encoder protocol passive unit 117, such as the storing or deleting of encoder data by the encoder protocol passive unit 117. From the perspective of the drive protocol active unit 115, no delay occurs due to the safety module 100, and in particular due to the encoder emulator 135, due to which the encoder protocol passive unit 117 is simulated, so that an error message by the drive protocol active unit 115 due to delayed response of the encoder protocol passive unit 117 may be avoided.

The encoder data transmitted via the second data interface 106 preferably comprise position data of the motor unit 113, which are exchanged between the drive unit 109 and the encoder unit 111 in a cyclic data communication for controlling the motor unit 113 via the drive unit 109. Alternatively, the encoder data transmitted via the second data interface 106 and cyclically exchanged between the drive unit 109 and the encoder unit 111 may comprise other parameter data of the motor unit 113.

Encoder data exchanged in an acyclic data exchange between the drive unit 109 and the encoder unit 111 may be forwarded within the safety module 100 via the third data interface 108.

If parameter data are requested from the drive protocol active unit 115 of the drive unit 109, which are preferably transmitted acyclically, the protocol passive unit 103 forwards the corresponding request to the encoder emulator 135 via the third data interface 108. The latter may either forward corresponding encoder data stored in the memory unit 139 to the protocol passive unit 103 via the third data interface 108, or forward the corresponding request via the third data interface 108 and a switching unit 133 to the protocol active unit 101, which sends the corresponding request to the encoder protocol passive unit 117 of the encoder unit 111. The latter subsequently sends out corresponding encoder data to the drive unit 109, which are forwarded by the protocol active unit 101 via the third data interface 108 to the encoder emulator 135, which in turn are forwarded by the encoder emulator 135 via the third data interface 108 to the protocol passive unit 103 and are sent out to the drive protocol active unit 115 by the protocol passive unit 103.

The encoder unit 111 parameter data received from the protocol active unit 101 may be transmitted from the protocol active unit 101 to the safety logic 105 via the third data interface 108, in addition to being analyzed by the safety logic 105.

The position data cyclically exchanged between the drive unit 109 and the encoder unit 111 may be limited to a first position datum. A second position datum, created e.g. by a safety encoder or another encoder unit 112 for safety analysis by the safety logic 105, may be transmitted cyclically together with the first position datum so that the second position datum received from the protocol active unit 101 is transmitted to the safety logic 105 via the second data interface 106. Alternatively, the second position datum may be transmitted acyclically together with the parameter data, so that the second position datum received from the protocol active unit 101 is transmitted to the safety logic 105 via the third data interface 108 and from the safety logic 105 to the protocol passive unit 103. For this purpose, a corresponding request to transmit second position data may previously be sent to the encoder unit 111 by the drive protocol active unit 115 of the drive unit 109. This request is transmitted in accordance with the acyclic data transmission from the protocol passive unit 103 via the third data interface 108 to the safety logic 105 and from the safety logic 105 via the switching unit 133 to the protocol active unit 101. Hereby, the switching unit 133 may act as a control element and control which of the data transmitted via the third data interface 108 from the encoder emulator 135 and the safety logic 105 are transmitted to the protocol active unit 101.

Via the two communication channels separated from each other, the cyclic communication channel realized by the second data interface 106 and the acyclic communication channel realized by the third data interface 108, it may be achieved that the cyclic data communication between the drive unit 109 and the encoder unit 111 may be performed without delay. Furthermore, it may be achieved that the safety logic 105 has access to both the cyclically transmitted position data, which is preferably limited to a first position datum, and the acyclically transmitted parameter data or the second position datum for performing the safety analysis.

As an alternative to the encoder interface 102 and to the further encoder interface 110, data communication between the drive unit 109 and the encoder unit 111 or the safety module 100 may be implemented via a data bus, in particular a field bus. For this purpose, a cross communication may be implemented that ensures a direct data communication between the drive unit 109, the encoder unit 111 and the safety module 100, in which data packets to be exchanged are not moderated via a bus active unit of the data bus, but are exchanged directly between the drive unit 109, the encoder unit 111 and the safety module 100.

The safety module 100 may be embodied as a hardware component, in particular as a bus terminal. The safety module 100 may comprise corresponding contact connections via which the safety module 100 may be connected to a drive unit 109 and an encoder unit 111.

An encoder unit 111 or a further encoder unit 112 may be an absolute encoder, an incremental encoder, a rotary encoder or a linear encoder. A motor unit 113 may be any motor unit, in particular a servo-motor unit.

The embodiment in FIG. 4 may be combined with features of the embodiments in FIGS. 1 and 3. In particular, the embodiment of FIG. 4 may be combined with a safety-related data communication 123 according to the embodiment in FIG. 1 and/or with a shutdown mechanism 129 and a shutdown connection 131 according to the embodiment in FIG. 3.

Figure 5:
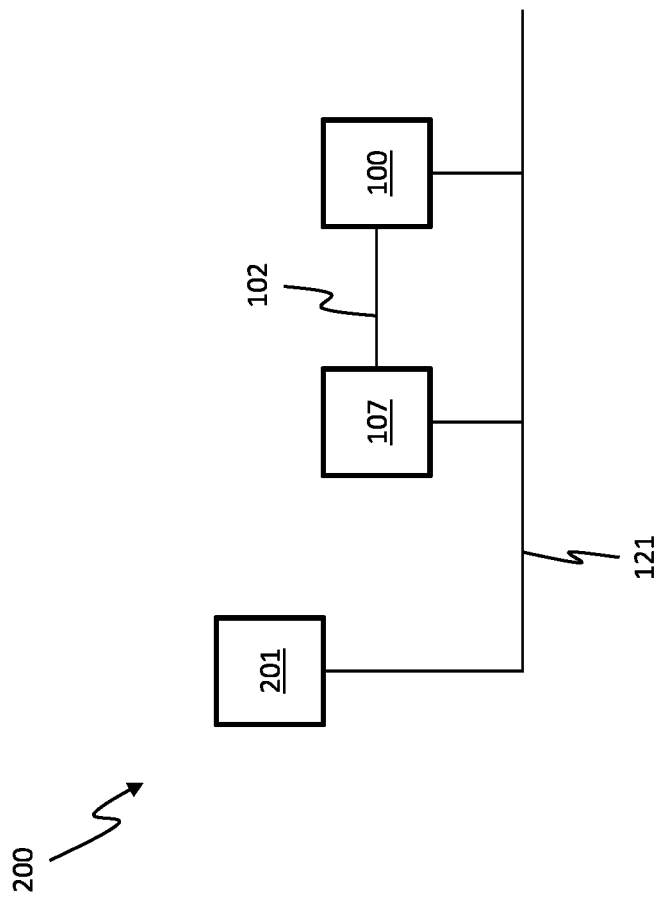
FIG. 5 is a schematic depiction of an automation system with a drive system having a safety module according to one embodiment.

FIG. 5 shows a schematic depiction of an automation system 200 comprising a drive system 107 with a safety module 100 according to an embodiment.

In the embodiment shown in FIG. 5, the automation system 200 comprises a control unit 201 and a drive system 107 that is connected to a safety module 100 via an encoder interface 102. In the embodiment of FIG. 5, both the drive system 107 and the safety module 100 are connected to the control unit 201 via a data bus connection 121. The drive system 107 may be controlled via the control unit 201.

As an alternative to the embodiment shown in FIG. 5, the automation system 200 may further comprise additional components. The data bus connection 121 may be a field-bus system.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

| List of reference numerals |
| --- |
| 100 safety module |
| 101 protocol active unit |
| 102 encoder interface |
| 103 protocol passive unit |
| 104 first data interface |
| 105 safety logic |
| 106 second data interface |
| 107 drive system |
| 108 third data interface |
| 109 drive unit |
| 110 further encoder interface |
| 111 encoder unit |
| 112 further encoder unit |
| 113 motor unit |
| 115 drive protocol active unit |
| 117 encoder protocol passive unit |
| 118 further encoder protocol passive unit |
| 119 control connection |
| 121 data bus connection |
| 123 safety-relevant data communication |
| 125 safety torque-off function |
| 127 safety Torque Off Connection |
| 129 shutdown mechanism |
| 131 shutdown connection |
| 133 circuit unit |
| 135 encoder emulator |
| 137 position emulation |
| 139 memory unit |

The invention claimed is:

1. A safety module for secure drive control of a drive system in an automation system, wherein the drive system comprises:
at least one drive unit comprising a drive protocol active unit having a processor and memory configured for operation as an active unit of an encoder protocol of an encoder interface, an encoder unit comprising an encoder protocol passive unit having a processor and memory configured for operation as a passive unit of the encoder protocol, and a motor unit;

wherein the safety module is formed as a hardware component comprising contact connections configured to connect with the encoder unit and the motor unit, wherein the safety module is integrated between the drive unit and the encoder unit and connected thereto via at least one data connection established by the contact connections, wherein the safety module further comprises a protocol active unit, a protocol passive unit and a safety logic configured to communicate with one another via data communication, and wherein the protocol active unit is configured as an active unit and the protocol passive unit is configured as a passive unit of the encoder protocol of the encoder interface, wherein the encoder interface provides the at least one data connection; and wherein the safety module comprises a processor and memory configured to:
  receive requests sent by the drive protocol active unit of the drive unit to the encoder protocol passive unit of the encoder unit to send out the encoder data by the protocol passive unit of the safety module;
  forward the received requests of the drive protocol active unit of the drive unit to send out the encoder data by the protocol passive unit to the protocol active unit of the safety unit;
  send out the received requests of the drive protocol active unit of the drive unit by the protocol active unit of the safety module to the encoder protocol passive unit of the encoder unit;
  receive the requested encoder data sent out from the encoder protocol passive unit of the encoder unit configured for operation as the passive unit of the encoder protocol to the drive protocol active unit of the drive unit configured for operation as the active unit of the encoder protocol based on the encoder protocol with the aid of the protocol active unit of the safety module;
  forward the received encoder data from the protocol active unit to the safety logic and the protocol passive unit;
  check the forwarded encoder data with the aid of the safety logic for correspondence with predetermined safety criteria relating to operation of the motor unit;
  send out the forwarded encoder data via the protocol passive unit based on the encoder protocol in corresponding data packets to the drive protocol active unit of the drive unit; and
  cause a stop of the operation of the motor unit with the aid of the safety logic, if the forwarded encoder data is detected by the safety logic as not corresponding to the predetermined safety criteria.

2. The safety module according to claim 1, wherein the safety module is further configured to send out, via the protocol active unit, requests to send out the encoder data to the encoder protocol passive unit of the encoder unit.

3. The safety module according to claim 1, wherein the safety module may further be synchronized with the drive unit, and wherein the safety module is configured to send out corresponding requests by the protocol active unit to the encoder protocol passive unit of the encoder unit in synchrony with sending out requests for the encoder data via the drive unit.

4. A safety module according to claim 1, wherein the safety module may further be connected to the drive unit via a data bus connection, and wherein the safety module is configured to send out, in order to cause a stop of the operation of the motor unit by the safety logic, a corresponding operation stop message based on a safety-related data packet according to a secure data bus protocol of the data bus connection to the drive unit.

5. The safety module according to claim 1, wherein the safety criteria comprise a maximum position and/or a maximum speed and/or a maximum acceleration and/or a maximum temperature of the motor unit.

6. A drive system comprising at least a drive unit, an encoder unit, a motor unit and a safety module according to claim 1, wherein the drive unit and the encoder unit are connected to each other via a data link and are configured to communicate via an exchange of data packets according to an encoder protocol, wherein the safety module is connected to the drive unit and the encoder unit via the data connection, and wherein the drive unit is connected to the motor unit via a control connection for controlling the motor unit.

7. An automation system comprising a control unit and at least the drive system according to claim 6, which is connected to the control unit via a data bus connection, wherein the control unit is configured to control the drive system.

* * * * *